United States Patent [19]
Winfield, Jr.

[11] 3,796,103
[45] Mar. 12, 1974

[54] POLISHED ROD PROTECTOR

[75] Inventor: Mason C. Winfield, Jr., Orchard Park, N.Y.

[73] Assignee: Rodgard Manufacturing Co., Inc., Orchard Park, N.Y.

[22] Filed: May 1, 1972

[21] Appl. No.: 249,261

[52] U.S. Cl.............. 74/18.2, 138/110, 264/248, 264/295, 277/174, 285/226
[51] Int. Cl............................................ F16j 15/52
[58] Field of Search ........ 74/18, 18.1, 18.2; 277/30, 277/174; 138/110, 121; 264/248, 295, 296, DIG. 52; 285/226, 227, 228, 299, 300, 301; 92/34, 42, 47

[56] References Cited
UNITED STATES PATENTS

| | | | |
|---|---|---|---|
| 3,186,722 | 6/1965 | Johnston | 277/30 X |
| 3,313,319 | 4/1967 | Osborn et al. | 285/226 X |
| 3,401,607 | 9/1968 | Wortman | 92/42 X |
| 2,964,961 | 12/1960 | Gulick | 74/18.2 |
| 679,898 | 8/1901 | Josse | 74/18 X |
| 724,510 | 4/1903 | Schutt | 74/18.1 X |
| 2,920,656 | 1/1960 | Bertolet, Jr. | 285/226 X |
| 2,943,577 | 7/1960 | Barker | 92/42 |
| 3,028,761 | 4/1962 | Cole, Jr. | 74/18 X |
| 3,284,264 | 11/1966 | O'Rourke | 285/226 |
| 1,378,118 | 5/1921 | Jacobsen et al. | 74/18.1 |

Primary Examiner—Allan D. Herrmann

[57] ABSTRACT

An extensible protector shroud having alternating inner and outer diameter portions defining adjacent convolutions, and formed of a plurality of one-piece sections molded in collapsed condition and each comprising a pair of generally radial walls of radially inwardly progressively decreasing thickness joined at their inner peripheral edges. The protector is connected to a polished rod for extension therewith, and retainer rings inside the outer diameter portions of the composite protector prevent inward collapsing thereof upon extension while a floating connection makes the protector self-aligning with the polished rod extending axially therethrough.

11 Claims, 5 Drawing Figures

PATENTED MAR 12 1974 3,796,103
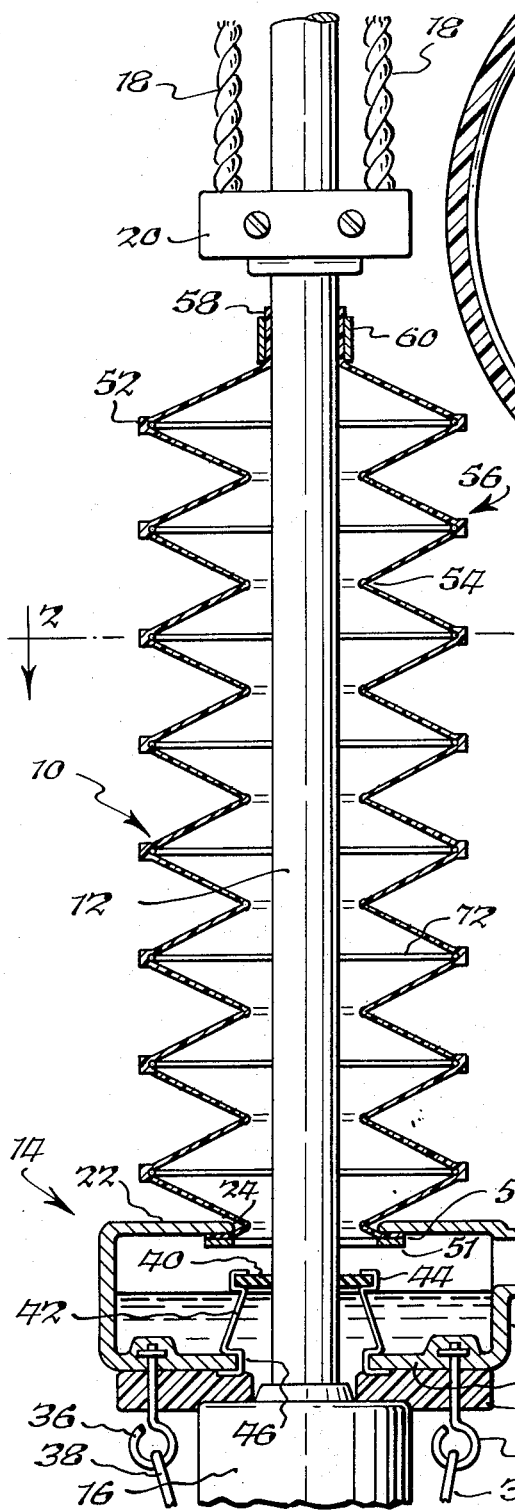
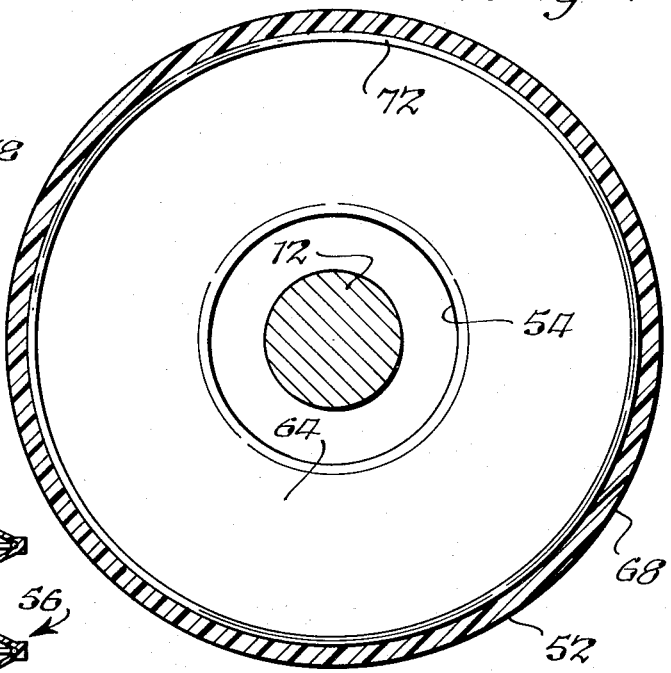
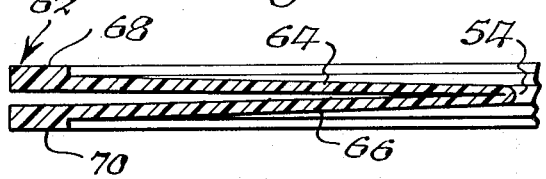
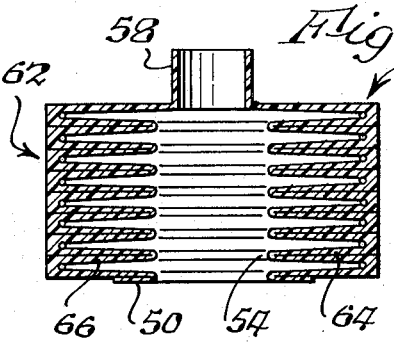

3,796,103

POLISHED ROD PROTECTOR

BACKGROUND OF THE INVENTION

This invention relates to a polished rod protector and, more particularly, to an improved extensible and collapsible shroud for a polished rod. While not limited thereto, this invention is particularly useful with polished rods which have a high extension factor, as in oil wells, for example.

In the oil well pumping art, polished rods are used to connect a string of sucker rods which actuate a pump at the bottom of the well to the external means of reciprocation. The polished rod extends through a stuffing box which includes packing for closely engaging the reciprocating polished rod to prevent the fluid product of the well from escaping past the polished rod. In its extended position a considerable portion of the polished rod projects above the stuffing box and, unless protected, is exposed to atmospheric dust and other foreign abrasive particles which tend to accumulate on the reciprocating rod and be carried therewith to the packing within the stuffing box. Such accumulations are abrasive, and cause the polished rod and the packing to wear excessively, resulting in leakage therebetween and requiring frequent replacement thereof. The frequency of replacement has a direct relation to economy of operation, and leakage of the fluid product poses an environmental pollution problem of increasing concern.

It has been proposed to protect polished rods by enclosing the projecting portion thereof in an elongated, extensible bellows having a plurality of convolutions intended to permit contraction and extension thereof in a manner accommodating retraction and extension of the reciprocating rod. See, for example, U.S. Pat. Nos. 3,186,722 and 3,270,810.

While this proposal has merit, it has not heretofore been adopted because the bellows must be capable of repeated extension to a length several times its retracted length, and a typical bellows is neither intended for nor capable of operation over such a range. The problem arises because a typical oil well polished rod will project only a few inches from the stuffing box when retracted, and as much as 9 feet or more when extended. If a typical bellows capable of being collapsed to a length of a few inches is extended several feet it is stretched beyond its capabilities. The bellows material does not stretch uniformly but puckers, creating zones of weakness and resulting in rapid failure of the bellows.

SUMMARY OF THE INVENTION

Accordingly, it is a primary object of the present invention to provide an improved polished rod protector which is strong and rugged in construction, durable and long-lasting in use and capable of repeated extension to a length many times its length when retracted.

It is another object of this invention to provide a floating connection at one end of the protector to effect self-alignment of the protector with the polished rod.

In one aspect thereof, the polished rod protector of the present invention is characterized by the provision of an extensible member formed of polyurethane and comprising a plurality of individually molded sections bonded together, each section comprising a pair of radial walls of radially inwardly progressively decreasing thickness integral at their inner peripheral edges to form inner diameter portions and bonded to adjacent sections at their outer peripheral edges to form outer diameter portions. Retainer rings secured inside the outer diameter portions of the protector member preclude collapse thereof upon extension, and the bottom of the protector is freely suspended within a housing so as to be self-aligning with the polished rod.

The foregoing and other objects, advantages and characterizing features of this invention will become clearly apparent from the ensuing detailed description of an illustrative embodiment thereof, taken together with the accompanying drawing wherein like reference numerals denote like parts throughout the various views.

BRIEF DESCRIPTION OF THE DRAWING FIGURES

FIG. 1 is a vertical sectional view of a polished rod protector constructed in accordance with this invention, the protector and rod being shown in an extended position, and the upper rod end being broken away for convenience in illustration;

FIG. 2 is a cross sectional view thereof, on an enlarged scale, taken about on line 2—2 of FIG. 1;

FIG. 3 is a fragmentary vertical sectional view, on an enlarged scale, showing a molded, single section of the polished rod protector of FIG. 1;

FIG. 4 is a fragmentary vertical sectional view, illustrating two sections bonded together and provided with reinforcing rings embedded in the outer diameter portions thereof, it being understood that in practice the collapsed sections will abut and sit on top of one another as shown in FIG. 5; and FIG. 5 is a vertical sectional view of the protector of FIG. 1 in its fully contracted condition occurring upon retraction of the rod which has been omitted from this view for greater clarity and ease in illustration.

DETAILED DESCRIPTION OF AN ILLUSTRATIVE EMBODIMENT

Referring now in detail to the illustrative embodiment depicted in the accompanying drawing, there is shown in FIG. 1 a polished rod protector of this invention, generally designated 10 and encircling the projecting upper end of a reciprocating polished rod 12 for shielding the latter against dust, foreign particles and other deleterious materials. Polished rod 12 is incorporated in a pumping system of a type utilized in oil wells, and extends through a liquid receiving container 14 and a stuffing box 16 as typically used in an oil well pumping operation. Rod 12 is connected at its lower end to a string of sucker rods (not shown) extending to the bottom of the well to actuate a pump, also not shown. The upper end of polished rod 12 is connected to a pair of hanger cables 18 by a clamping bracket 20, the cables 18 being suspended from a suitable energy source (not shown) for reciprocating polished rod 12.

Container 14 is provided with a top wall 22 having a central opening 24 therein, a side wall 26 having an outlet 28 therein, and a bottom wall 30 having an opening therein registry with opening 24 for receiving polished rod 12 therethrough. Any oil, water or gas escaping past stuffing box 16 is accumulated in container 14, providing a reservoir of oil which lubricates the rod 12 and keeps it cool. A resilient sealing pad 34 is interposed between container bottom wall 30 and the upper end of stuffing box 16 to provide a fluid tight seal therebetween. Three hold down eye bolts 36 are anchored at their upper ends in container bottom wall 30 to secure container 14 to the well-head or some other suitable stationary structure as by means of connecting tension springs 38 which exert constant downward pressure on container 14 to insure proper sealing by pad 34, and to counteract any lifting effect resulting from extension of protector 10.

An annular, resiliently yieldable wiper member 40 is located in container 14 and encircles polished rod 12 in wiping engagement therewith for removing liquids from polished rod 12 as it is reciprocated into its extended position. Wiper member 40 is secured in place as by three connectors 42 having grooved portions 44 at their upper ends for receiving the marginal edge of wiper member 40 and grooved portions 46 at their lower ends for receiving the inner peripheral edge of container bottom wall 30. Wiper member 40 also serves as a deflector so that in the event of the failure of the stuffing box packing, any escape of oil, water or gas will be deflected downwardly and ultimately discharged through outlet 28 for collection rather than flowing upwardly through container opening 24 into protector 10.

In accordance with this invention, polished rod protector 10 comprises a longitudinally extensible member having a plurality of alternating relatively large and small diameter portions defining crest portions 52 and root portions 54, respectively, forming a plurality of serially connected convolutions 56. Member 10, shown in an extended position in FIG. 1, is provided with a cylindrical neck portion 58 at its upper end encircling the upper end of polished rod 12 and attached thereto for reciprocating movement therewith by means of an adjustable ring clamp 60.

It is a feature of this invention that the lower end of member 10 "floats" in container 14 in order to be self-aligning with polished rod 12. To this end, the bottom of member 10 terminates in a lip portion 50 freely suspended within container 14 and radially spaced from polished rod 12. A reinforcing ring 51 secured to this lowermost portion of member 10 prevents passage thereof through the restricted opening 24 in container 14 unless the ring is manually flexed out of its plane and tilted, whereby in normal use engagement thereof with top wall 22 serves to retain the bottom end of member 10 within container 14 during extension, as shown in FIG. 1, while permitting the lower end of member 10 to shift laterally for self-alignment with rod 12. This is important, because polished rods often are misaligned in such pumping systems, and in the absence of self-alignment undue wear of member 10, by engagement with rod 12, is apt to occur.

Thus, the protector of this invention provides a shroud protectively enclosing the projection portion of the rod 12.

In accordance with this invention, protector 10 is composed of a highly elastic, resiliently yieldable elastomeric material, preferably polyurethane, or any other suitable material having similar properties of durability, sufficient flex and elongation capabilities, high tear and abrasion resistance and capable of withstanding the temperature extremes, ultra violet rays, weathering, oxidation, oils, acids and deleterious chemicals to which it may be exposed. Protector 10 is formed of a plurality of individually molded, one-piece sections 62 (FIG. 3), each comprising a first radial wall portion 64 and a second radial wall portion 66 integrally joined at their inner ends to form a root portion 54 and terminating at their outer ends in generally flat, annular enlargements or rims 68 and 70. To form the composite structure 10, sections 62 are secured together at their outer peripheries by bonding the annular flat surface of rim 68 to the annular flat mating surface of rim 70 of the adjacent section 62. The bonding of adjacent sections 62 can be effected by a suitable adhesive or by the application of heat and pressure or ultrasonically, as desired. It is a particular feature of this invention that the individual sections 62 are molded in a collapsed condition as shown in FIG. 3, making this their natural, relaxed state, and when joined they impart this characteristic to the composite structure which also assumes a collapsed position in its relaxed state. This insures proper collapsing of protector 10 to a compressed height equaling the stacked thicknesses of rims 68 and 70 of the assembled protector 10, as shown in FIG. 5, thereby accommodating the relatively short length of rod 12 which projects in its fully retracted position. This distinguishes the structure of the instant invention from a conventional bellows which is molded in a partially extended or open state, must be forced to the fully collapsed condition obtained by the instant invention in its relaxed state, and would not be operable over such a range.

When member 10 is extended, crest portions 52 normally would tend to collapse and would pucker as they seek to occupy a lesser space. Such puckering results in loss of control and introduces zones of weakness, all of which is undesirable and potentially destructive of the member. This is avoided in the instant invention partially because the thickened rims 68 and 70 resist this tendency and more particularly by the inclusion of a retainer ring 72 at the juncture of rims 68 and 70 to positively prevent such undesirable puckering. Retainer rings 72 serve as reinforcement members, strengthening the outer crest portions 52 and forcing the member to maintain its outer diameter.

While the retainer rings 72 shown in FIG. 1 are generally circular in cross section and are positioned against the inner surfaces of crest portions 52, a preferred form is shown in FIG. 4 and comprises an annular, generally flat retainer ring 72' embedded between rims 68 and 70 of adjacent sections 62 during the bonding thereof. The latter form of retainer ring 72' occupies so little vertical space as not to interfere with the complete collapsing of member 10. Retainer rings 72 and 72' are formed of hardened, spring metal that causes crest portions 52 to rigidly maintain their circularity as member 10 extends, although plastic and other materials of suitable strength can be used.

With the crest portions 52 held against collapse, the root portions 54 will stretch and expand as the protector is extended, the amount of stretching being greatest at the inner diameter root portions. To reduce the force required for this, radial walls 64 and 66 are tapered inwardly from their outer peripheral edges or rims 68 and 70 toward root portions 54 to provide a progressively decreasing thickness from the outer peripheries of walls 64 and 66 to the inner peripheries thereof, whereby the thinnest material is provided at the zones of greatest stretching. While not limited thereto, the thickness of walls 64 and 66 adjacent their outer peripheries can vary from about .030 to .040 inch and the thickness of such walls adjacent their inner peripheries can be on the order of about .025 to .035 inch respectively, for example, always being less than the outer periphery. By providing a continuous taper in radial walls 64 and 66 to form a relatively thin inner portion, less force is required to stretch or extend these walls at root portions 54, thereby reducing the load on the polished rod reciprocating means.

As polished rod 12 is extended from its retracted position during the operation thereof, it carries the upper end of protector 10 therewith by means of the clamped neck portion 58. This opens the uppermost section 62 by moving the outer diameter portions 68, 70 thereof apart. In doing this, the material of the root portion of that section is slightly stretched. After very limited stretching of that particular root portion, well within the elastic capabilities of the material, the succeeding section is opened, in the same manner, and this continues with succeeding sections until the rod is fully extended. The reduced thicknesses of walls 64 and 66 at their inner peripheries facilitates the separation of walls 64 and 66 by stretching the root portions, and the reinforced outer peripheries thereof prevent radial collapse and puckering of crest portions 52. The polished rod protector of this invention is capable of repeated extension and contraction of the required magnitude and will maintain its integrity over a prolonged period of use.

By way of example, a protector 10 having a collapsed height of approximately 3.5 inches can be readily extended to a height or length of about 9 feet, an extension factor or ratio of about 30:1, with only moderate stretching and without unduly straining the material thereof. Such protector, having an i.d. of 3 inches, sufficient to accommodate all conventional oil well polished rods, can have an o.d. of 9 inches, a maximum thickness (at 68 and 70) of 0.035 inches, and a reinforcing ring thickness of 0.03 inches. Each convolution has an overall stack height of 0.10 inches and will provide 3 inches of movement with virtually no stretching. Four convolutions therefore give 1 foot of movement, requiring only 36 convolutions for 9 foot of movement. This gives an overall protector stack height of 3.6 inches in a protector unit weighing only about 5½ pounds.

From the foregoing, it is apparent that the present invention fully accomplishes its intended objects and provides an improved polished rod protector capable of repeated extension and contraction over a prolonged period of use. By the provision of thickened wall portions and a retainer ring at the outer peripheral or crest portions of the protector, puckering and radial collapse of these crest portions is prevented. Also, the relatively thin inner peripheral portions of the radial walls facilitates easy extension without excessively stretching any area of the material. By forming the protector of individual sections molded in a collapsed condition, proper contraction and collapse of the protector is insured because the material will be in its free state when the protector is retracted to its fully collapsed condition. Also the protector is floatingly mounted at its lower end in the container to enable self-alignment of the protector relative to the polished rod. Forming the protector of polyurethane enables it to withstand weathering and the deleterious effects of the elements encountered in an oil well environment and offers more elasticity and can be much thinner than if formed of conventional rubbers or plastics.

While the protector of this invention is illustrated herein as a shroud for a polished rod used in oil well pumping operations, it should be understood that the utility thereof is in no way limited thereto. The protector of this invention can be utilized in any environment where it is desired to protect a polished rod, including air, hydraulic and mechanically actuated piston rods, and the like.

A preferred form of this invention having been disclosed in detail, it is to be understood that this has been done by way of illustration only.

I claim:

1. A polished rod and protector arrangement comprising, in combination, a housing, a polished rod projecting through said housing, means mounting said rod for reciprocation, a convoluted member connected adjacent one end thereof to said polished rod for extension and retraction with said rod, said member enclosing a portion of the projecting rod and the other end of said member being laterally shiftably mounted within said housing for self-alignment with said polished rod.

2. A protector according to claim 1 wherein said member is formed of elastomeric material of continuous wall form and provides a protective shroud enclosing a portion of said rod.

3. A protector according to claim 2 wherein said material is polyurethane.

4. The combination of claim 1, wherein the material of said protector is in its free state when said protector is retracted to a substantially fully collapsed condition, and wherein the outer diameter portions of said protector are supported against inward collapse upon extension of said protector.

5. A polished rod protector comprising, in combination with a polished rod mounted for reciprocation, an elongated extensible member of resiliently yieldable material having alternating inner and outer diameter portions along the length thereof joined by radial walls forming adjacent convolutions, means mounting said member about said rod for extension and retraction upon reciprocation of said rod, retainer members positioned within said member adjacent said outer diameter portions thereof for reinforcing the latter against inward collapse upon extension of said member, said walls being of progressively decreasing thickness from their outer periphery to their inner periphery.

6. A polished rod protector comprising, in combination with a polished rod mounted for reciprocation, an elongated extensible member of resiliently yieldable material having alternating inner and outer diameter portions along the length thereof joined by radial walls forming adjacent convolutions, means mounting said member about said rod for extension and retraction with said rod, means in addition to the material of said member reinforcing said outer diameter portions against inward collapse upon extension of said member, said member comprising a plurality of one-piece sections each having a pair of radial walls integrally joined at their inner peripheral edges, said sections being bonded together at their outer peripheral edges.

7. A protector according to claim 6 wherein said sections are molded in a collapsed condition whereby the material thereof is in a free state when said member is in its collapsed condition.

8. A polished rod protector comprising, in combination with a polished rod mounted for reciprocation, an elongated extensible member of resiliently yieldable material having alternating inner and outer diameter portions along the length thereof joined by radial walls forming adjacent convolutions, means mounting said member about said rod for extension and retraction with said rod, means reinforcing said outer diameter portions against inward collapse upon extension of said member, said radial walls being of progressively decreasing thickness from their outer peripheral edges to their inner peripheral edges.

9. A protector according to claim 8 wherein said reinforcing means is in addition to the material of said member, and said resiliently yieldable material is in a substantially free state when said member is contracted to a substantially fully collapsed condition.

10. A protector according to claim 8 wherein said reinforcing means comprises a retainer annular member within each outer diameter portion.

11. A protector according to claim 10 wherein said retainer annular member is embedded in the wall of said outer diameter portion.

* * * * *